(12) United States Patent
Hettiger

(10) Patent No.: US 7,354,235 B2
(45) Date of Patent: Apr. 8, 2008

(54) DISCHARGE ELBOW FOR A FORAGE HARVESTER

(75) Inventor: Marcus Hettiger, Saarbrücken (DE)

(73) Assignee: Deere & Company, Moline, IL (US)

( * ) Notice: Subject to any disclaimer, the term of this patent is extended or adjusted under 35 U.S.C. 154(b) by 138 days.

(21) Appl. No.: 11/384,154

(22) Filed: Mar. 17, 2006

(65) Prior Publication Data

US 2006/0228198 A1    Oct. 12, 2006

(30) Foreign Application Priority Data

Apr. 9, 2005  (DE)  ............... 10 2005 016 334

(51) Int. Cl.
*B65G 1/00* (2006.01)
*B65G 65/00* (2006.01)
(52) U.S. Cl. .......................... 414/304; 56/71
(58) Field of Classification Search ............... 414/304; 406/114, 167, 193; 193/812, 313, 306, 316.1, 193/304, 34; 285/25; 460/114; 56/71
See application file for complete search history.

(56) References Cited

U.S. PATENT DOCUMENTS

| 2,309,715 A | * | 1/1943 | Rudow | .................... 414/140.9 |
| 3,088,779 A | * | 5/1963 | Vachon | ....................... 406/158 |
| 3,110,521 A | | 11/1963 | Rogers et al. | |
| 3,651,910 A | * | 3/1972 | Buschbom | ................... 193/17 |
| 4,130,300 A | | 12/1978 | Sheridan | |
| 4,251,170 A | | 2/1981 | Sheridan | |
| 5,203,442 A | * | 4/1993 | Oury et al. | ................. 198/313 |
| 5,953,892 A | * | 9/1999 | Albicker et al. | ................ 56/71 |
| 6,056,252 A | * | 5/2000 | Johannsen | ............... 248/188.3 |
| 6,360,876 B1 | * | 3/2002 | Nohl et al. | ................. 198/588 |
| 6,929,113 B1 | * | 8/2005 | Hoover et al. | ............. 198/812 |
| 6,939,222 B2 | * | 9/2005 | Grossjohann et al. | ....... 460/114 |

FOREIGN PATENT DOCUMENTS

| DE | 1 165 333 | 6/1960 |
| DE | 28 42 874 | 10/1978 |
| DE | 196 41 211 | 9/1996 |
| DE | 100 21 660 | 5/2000 |
| DE | 103 35 583 | 7/2003 |

OTHER PUBLICATIONS

European Search Report, Jul. 25, 2006, 4 Pages.

* cited by examiner

*Primary Examiner*—Árpád Fábián Kovács

(57) ABSTRACT

A discharge elbow for a forage harvester. The discharge elbow includes a frame-shaped support assembly and at least one locking element attached to the inside of the support assembly.

19 Claims, 3 Drawing Sheets

DISCHARGE ELBOW FOR A FORAGE HARVESTER

BACKGROUND

1. Field of the Invention

The present invention generally relates to a discharge elbow for a forage harvester.

2. Description of Related Art

Forage harvesters are used in agriculture in order to cut crop to be harvested from a field, to pick the crop up, and to chop the crop by means of a chopper drum or a disk wheel chopper and to discharge it to a transport vehicle through an adjustable discharge elbow after accelerating it by means of a blower. In most cases, the harvested plants are used as silage for animal fodder.

For reasons of manufacture and cost, the discharge elbow is provided with a rectangular cross section and is composed of massive sheet metal components which define its walls. An upper sheet metal component borders the flow of harvested crop in the upward direction, while sheet metal components at the sides border the flow of harvested crop in the side ways direction and simultaneously provide adequate stability for the discharge elbow in the vertical direction. As a rule at the bottom side the commercially available discharge elbows are closed partially or completely by sheet metal floors. In smaller attached choppers circular cross sections have also been applied to discharge elbows.

The commercially available, rectangular discharge elbows are relatively heavy due to the massive configurations of the walls, since particularly the upper walls and to a lesser degree the side walls of the discharge elbow wear over time due to the harvested crop flowing past them or impinging on them. Although sheet metal wear plates may be attached to the inside of the outer walls so that they can be removed, due to the poor accessibility it is seen as a disadvantage for maintenance and relatively costly. Even if the exchange of the wear plates is simplified, the total weight of the discharge elbow is not affected positively.

SUMMARY

In satisfying the above need, as well as overcoming the enumerated drawbacks and other limitations of the related art, the present invention provides an improved discharge elbow for a forage harvester that has a reduced weight at given dimensions.

Accordingly, the discharge elbow is configured as a frame-shape, for example a lattice-shape, support assembly with a locking element attached to its interior. Accordingly the discharge elbow may be provided over part of its length in the form of a lattice tower or a high tension line tower. The support assembly provides at least a major portion of the mechanical stability of the discharge elbow and can be configured at a relatively low weight based on the frame-shaped or lattice-shaped configuration. The locking element borders and guides the flow of the harvested crop and protects the support assembly against abrasion from the harvested crop. Since the locking element need provide no mechanical stability or only a small degree of mechanical stability for the discharge elbow it can be dimensioned for the expected wear. For example, a locking element arranged at a side wall of the discharge elbow can be proportioned thinner than a locking element arranged at the upper wall.

In this way, a weight reduction is attained and the stability is increased. Locking elements attached to the interior of the support assembly are very easily accessible due to the frame or lattice configuration of the support assembly and can therefore be assembled and disassembled very easily. The discharge elbow can be dimensioned longer than the known discharge elbows without any significant increase in weight, in order to make possible a sufficient side spacing between the front harvesting attachment of the forage harvester and the transport vehicle despite the constantly increasing operating widths of the front harvesting attachments.

In a preferred embodiment of the invention, the support assembly of the discharge elbow includes longitudinal carriers extending in the longitudinal direction at its edges or corners. Adjoining longitudinal carriers are connected to each other by struts at certain intervals that may form right, obtuse or acute angles with the previous longitudinal carriers.

Further objects, features and advantages of this invention will become readily apparent to persons skilled in the art after a review of the following description, with reference to the drawings and claims that are appended to and form a part of this specification.

DETAILED DESCRIPTION

Figure 1:
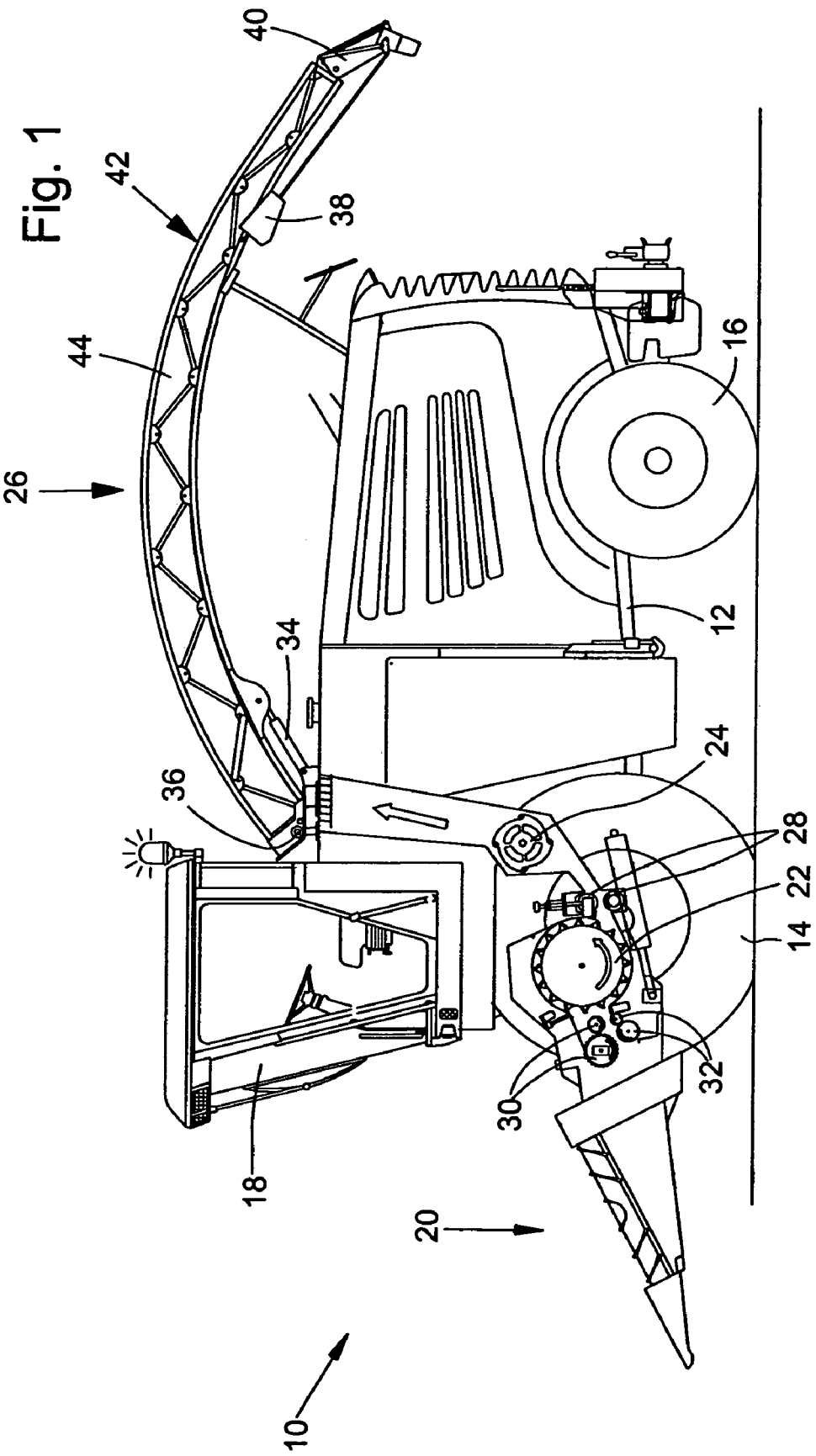
FIG. 1 shows a forage harvester with a discharge elbow according to one embodiment of the invention.

A self-propelled forage harvester 10, shown in FIG. 1, is supported on a frame 12 that is carried by driven front wheels 14 and steerable rear wheels 16. The forage harvester 10 is controlled from an operator's cab 18 from which a front harvesting attachment 20, appropriate to the harvest of stalk-like crops, can be controlled visually. In the embodiment shown, the front harvesting attachment 20 is a corn head shown operating independently of rows. The front harvesting attachment 20 takes crop up from the ground such as corn, cereal crop or the like and conducts it to a chopper drum 22 by means of upper rough pressing rolls 30 and lower rough pressing rolls 32. The chopper drum 22 chops the crop into small pieces and delivers it to a conveyor arrangement 24. The harvested crop leaves the harvesting machine 10 to an accompanying trailer through a discharge elbow 26. A post-chopper reduction arrangement 28 extends between the chopper drum 22 and the conveyor arrangement 24, through which the crop to be conveyed is conducted tangentially to the conveyor arrangement 24.

The discharge elbow 26 may be rotated by a first actuator, not shown, about the vertical axis at its upstream end. A second actuator 34 permits an adjustment of the height of the discharge elbow 26 about a horizontal axis 36 and a third actuator 38 makes it possible to pivot a discharge flap 40.

Figure 2:
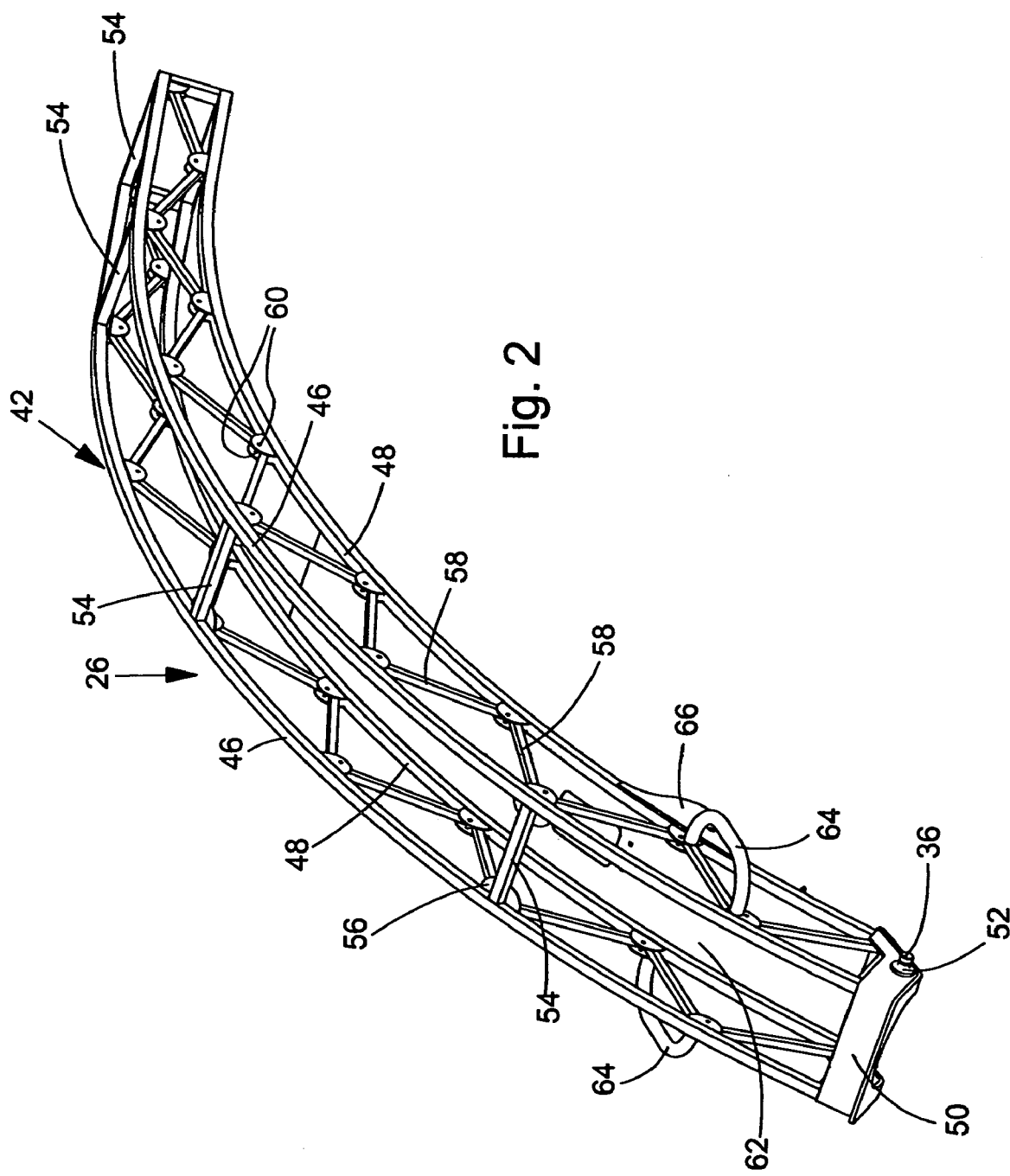
FIG. 2 shows a perspective view of the support assembly of the discharge elbow.

The discharge elbow 26 is composed of a support assembly 42 and locking elements 44 attached to its interior so that they can be removed. The support assembly 42 is shown in FIG. 2 in greater detail. The support assembly 42 contains two upper longitudinal carriers 46 extending over its entire length that are curved in a bow shape, as well as two lower longitudinal carriers 48 extending over its entire length that are also curved in a bow shape. The longitudinal carriers 46, 48 define a rectangular interior cross section. However, this interior cross section could also be trapezoidal with a spacing between the upper longitudinal carriers 46 that is smaller than the spacing between the lower longitudinal carriers 48. At their ends facing the forage harvester 10, shown at the left in FIG. 2, the longitudinal carriers 46, 48 are connected to each other by a U-shaped weldment 50 that also includes a journal 52. The journal 52 is connected by joints to the frame 12 of the forage harvester 10 causing the journal 52 to be free to pivot about the axis 26.

The upper longitudinal carriers 46 are connected to each other by four upper struts 54, each of which extends at right angles to the upper longitudinal carriers 46. In order to increase stability, the regions of the upper longitudinal carriers 46 and the upper struts 54 making contact with each other are connected at the underside of the upper struts 54 by sheet metal reinforcements of quarter-circular cross section. As a result, four rectangular free areas remain between the weldment 50 and the individual upper struts 54, as well as the upper longitudinal carriers 46. The upper longitudinal carriers 46 and the struts 54 form a frame. Diagonal struts that extend between adjacent upper struts 54 can also be inserted between the upper longitudinal carriers 46. Preferably all the upper struts 54 are configured identically.

The lower longitudinal carriers 48 are connected to the upper longitudinal carriers 46 arranged above them by side struts 58 each of which extends at an angle of approximately 45° to the longitudinal carriers 46, 48. In order to increase the stability, the areas of the upper longitudinal carriers 46 and the side struts 58 are connected to each other by semi-circular sheet metal reinforcements 60 at the inner and the outer sides of the side struts 58. Similarly, the regions of the lower longitudinal carriers 48 and the side struts 58 that are in contact with each other are connected by semicircular sheet metal reinforcements 60. The upper longitudinal carriers 46, the lower longitudinal carriers 48, and the struts 58 together form a lattice. In one embodiment, all of the side struts 58 may be configured identically. In addition, the side struts 58 could also be configured identically with the upper struts 54.

The lower longitudinal carriers 48 are connected to each other by a sheet metal floor 62 over at least the upstream half of the length of the support assembly 42. At the upstream end of the support assembly 42, the upper longitudinal carrier 46 is connected to the lower longitudinal carrier 48, for example by U-shaped tubes 64 parallel to a strut 58 that are used as retaining handgrips. The lower longitudinal carriers 48 may also carry brackets 66 that are used as an attaching point for the piston rod of the second actuator 34.

The longitudinal carriers 46, 48, as well as the struts 54, 58, are configured as single large components or in the form of pipes and may be made of metal, for example steel, or an appropriate plastic. They are welded and/or attached with adhesive and/or screws and/or riveted and/or soldered to each other or immobilized relative to each other in any other desired way. To improve the torsional stiffness, the longitudinal carriers 46, 48 and/or the struts 54, 58 may also be profiled, for example, with internal spiral or helical reinforcements and any desired cross section in addition to the rectangular cross section shown.

Figure 3:
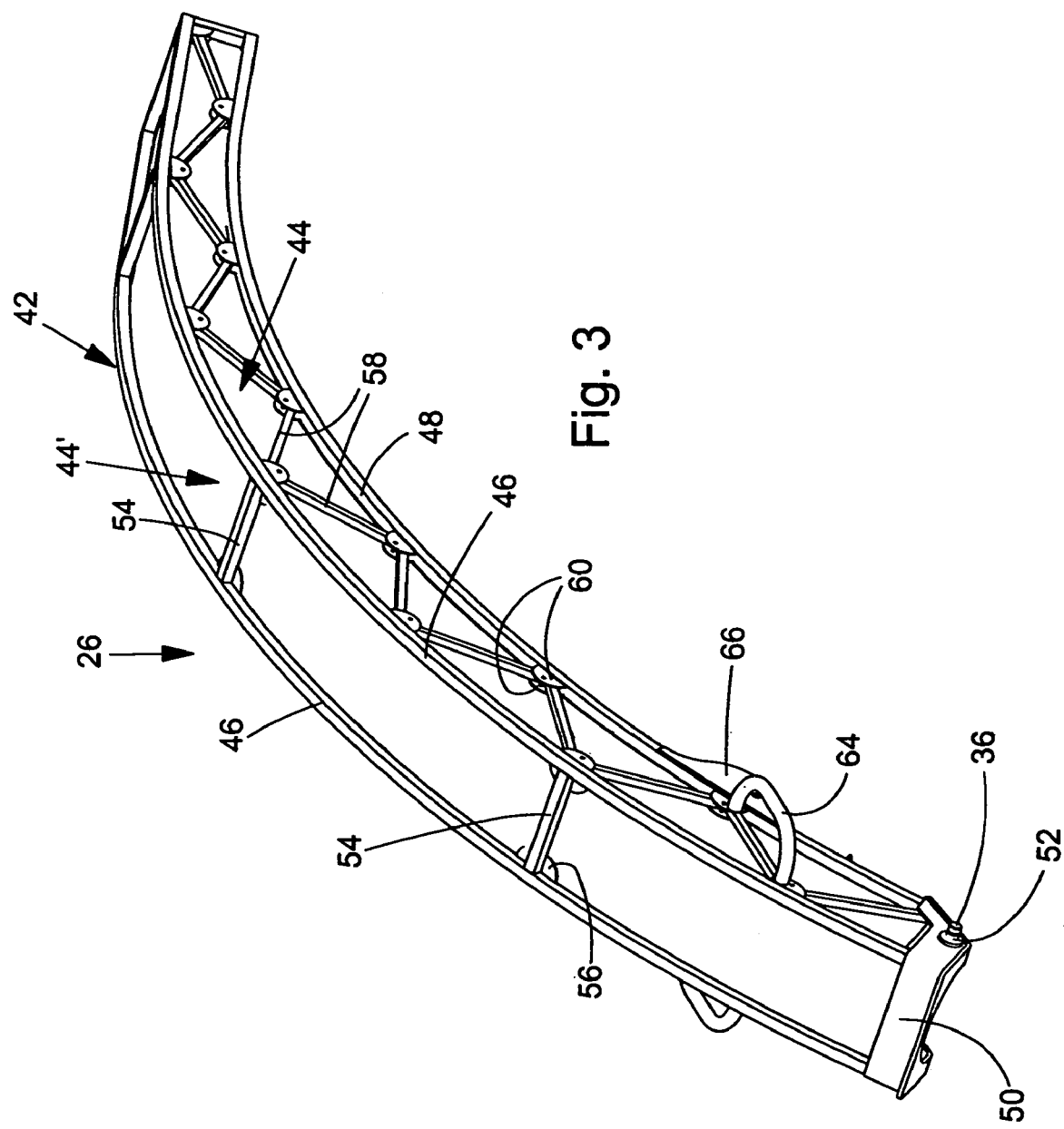
FIG. 3 shows a perspective view of the support assembly of FIG. 2 with attached locking elements.

In FIG. 3 the discharge elbow 26 is equipped with the locking elements 44, 44'. The upper locking elements 44' extend between the upper longitudinal carriers 46. The upper locking elements 44' are attached to the sheet metal reinforcements 56 with screws or fastened, so that they can be removed, for example, attached with adhesive or riveted or immobilized magnetically or fastened in some other way to the longitudinal carriers 46 and/or to the struts 54 and/or the side locking elements 44. In a preferred embodiment there are four upper locking elements 44' each of which extends between two adjoining upper struts 54 or between the upper strut 54 located further upstream and the weldment 50. However, a one-piece locking element 44' would also be possible, that extends over the entire length of the discharge elbow 26 and can be turned around when its upstream region is worn due to abrasion or any other desired division of the upper locking elements 44' in the longitudinal or the transverse direction of the discharge elbow 26. Corresponding to the bent contour of the upper longitudinal carriers 46, the upper locking elements 44' are bowed and, manufactured of metal, for example steel which preferably is hardened or equipped with a wear resistant coating.

Furthermore, plate-shaped side locking elements 44 that are bow-shaped extend between each of the upper longitudinal carriers 46 and the lower longitudinal carriers 48 arranged underneath them. The side locking elements 44 are plane in themselves and attached to the sheet metal reinforcements 60 by means of screws or by other means, for example, adhesive. In the embodiment shown, the side locking elements 44 extend over the entire length of the discharge elbow 26, although here too, any other desired distribution of smaller locking elements 44 would be possible. As a rule the side locking elements 44 also may be made of metal, for example steel that preferably is hardened or is equipped with a wear resistant coating.

The support assembly 42 forms, together with the longitudinal carriers 46, 48 and the struts 54, 58 a lattice that provides the necessary mechanical stability for the discharge elbow. The locking elements 44, 44' form a side and upper guide for the flow of harvested crop ejected by the forage harvester 10 and protect the support assembly from the abrasive flow of harvested crop. In case of wear, the locking elements 44, 44' can be replaced without any problems. Since the upper locking elements 44' are subject to a higher amount of wear than the side locking elements 44, they are preferably configured thicker than the side locking elements 44. The latter may be configured rather thin and hence dimensioned very light.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

I claim:

1. Discharge elbow for a forage harvester comprising a frame-shaped support assembly including longitudinal carriers extending along the edges of the discharge elbow and struts between the longitudinal carriers and at least one locking element attached to the inside of the support assembly.

2. Discharge elbow according to claim 1, wherein the locking elements are replaceable.

3. Discharge elbow according to claim 1, wherein the locking element is plate-shaped.

4. Discharge elbow according to claim 1, wherein the locking element is a metal sheet.

5. Discharge elbow according to claim 1, wherein the frame-shaped support is lattice-shaped.

6. Discharge elbow according to claim 5, wherein the frame-shaped support includes the longitudinal carriers that are elongated three-dimensional structural members.

7. Discharge elbow according to claim 5, wherein the frame-shaped support includes the longitudinal carriers that are tubular members.

8. Discharge elbow according to claim 5, wherein the frame-shaped support includes the longitudinal carriers and the at least one locking element extends between the longitudinal carriers.

9. Discharge elbow according to claim 5, wherein the frame-shaped support includes upper longitudinal supports, and wherein struts are connected to and extend between the upper longitudinal supports.

10. Discharge elbow according to claim 9, wherein the struts extend generally perpendicularly between the upper longitudinal supports.

11. Discharge elbow according to claim 9, wherein the struts are connected to the upper longitudinal supports by reinforcements.

12. Discharge elbow according to claim 11, wherein the locking elements are attached to the reinforcements.

13. Discharge elbow according to claim 1, wherein the at least one locking element is a plurality of locking elements.

14. Discharge elbow according to claim 1, wherein the frame-shaped support includes a pair of upper longitudinal supports connected to a pair of lower longitudinal supports.

15. Discharge elbow according to claim 14, wherein the upper and lower longitudinal supports are connected by struts extending therebetween.

16. Discharge elbow according to claim 15, wherein the struts extend generally diagonally between the upper and lower longitudinal supports.

17. Discharge elbow according to claim 14, wherein the struts are connected to the upper and lower longitudinal supports by reinforcements.

18. Discharge elbow according to claim 17, wherein the locking element is attached to the reinforcements.

19. Discharge elbow according to claim 18, wherein the reinforcements are plate-shaped.

* * * * *